Oct. 19, 1965 H. W. HENKELS 3,213,339

SEMICONDUCTOR DEVICE FOR CONTROLLING THE CONTINUITY
OF MULTIPLE ELECTRIC PATHS

Filed July 2, 1962

3,213,339

SEMICONDUCTOR DEVICE FOR CONTROLLING THE CONTINUITY OF MULTIPLE ELECTRIC PATHS

Herbert W. Henkels, deceased, late of Rockwood, Pa., by Patricia Henkels, administratrix, Rockwood, Pa., assignor to Westinghouse Electric Corporation, East Pittsburgh, Pa., a corporation of Pennsylvania Filed July 2, 1962, Ser. No. 207,128
7 Claims. (Cl. 317—235)

The present invention relates to devices for controlling the continuity of multiple electric paths and more particularly to such devices which include monolithically formed semiconductive regions.

Where the continuity of each of a plurality of electric paths is to be controlled, it is desirable in many applications to employ a device including monolithic semiconductive regions which provide control for each of the paths. Conventional mechanical or electronic combinations providing various path controlling functions can, of course, be employed for this purpose. However, semiconductor devices are more reliable and smaller in size and are characterized with certain other important advantages, as compared to conventional combinations, when employed for controlling electric paths or for providing other electrical functions.

Thus, it is an object of the invention to provide a semiconductor comprising a monolithic multicontact electronic switch device arranged to control the continuity of multiple electric paths.

It is another object of the invention to provide a multiple switch semiconductor device in which the control of the continuity of any one path depends upon a coincidence of events.

A further object of the invention is to provide a multiple switch semiconductor device in which the continuity of any one path can be maintained once completed so long as sufficient voltage is maintained across the one path.

An additional object of the invention is to provide a multiple switch semiconductor device in which the continuity of any one path continues only so long as an actuating signal for that path continues.

These and other objects of the invention will become more apparent upon consideration of the following detailed description of the invention along with the attached drawing, in which.

In accordance with the broad principles of the invention, a semiconductor device which can operate as a multicontact switch includes a plurality of monolithic semiconductive regions, so arranged and correlated as to provide multiple electric paths and includes means for enabling the continuity of each of the paths to be controlled selectively. To clarify these broad precepts, the detailed description of several embodiments of the invention will now be set forth.

Figure 1:
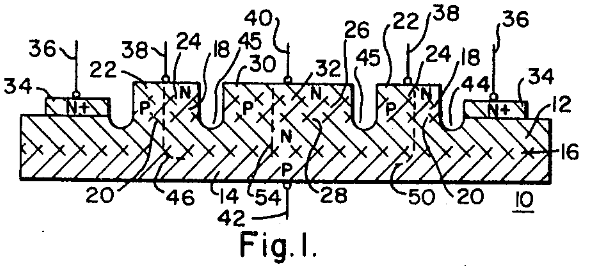
FIGURE 1 is a diametrically sectioned view of a semiconductor device fabricated in accordance with the principles of the invention.

With reference to FIG. 1, a semiconductor arrangement or device 10 of semiconductive material and in this instance in circular geometric form includes a body region 12 of one conductivity type (either p or n, n in this example) and a collector region 14 of the other conductivity type (either n or p, p in this example) with the collector region 14 crystally adjoining the body 12 to form a p-n junction 16. By "crystally adjoining" it is that the collector 14 and the body 12 are so related as to form a crystalline body.

Oppositely of the collector 14, a plurality of regions 18 being circumferentially spaced and electrically isolated by channels 19 (FIG. 2) and being of the one conductivity type, or p-type in this instance, crystally adjoin the body 12 to form respective p-n junctions 20. An emitter region 22 crystally adjoins each region 18 on the side remote from the body 12 to form respective p-n junctions 24. The emitter regions 22 are of the other conductivity type or n-type in this instance. Centrally of the device 10, a region 26 being of p-type conductivity consistently with this example, is adjoined with the body 12 to form a p-n junction 28 and an emitter region 30 is crystally adjoined with the region 26 to form a p-n junction 32. As can be determined from FIG. 2, each pair of adjoining regions 18 and 22, being in columnar relation in this embodiment of the invention, are spaced radially outwardly from the regions 26 and 30 which are also in columnar relation.

Radially outwardly from each columnar combination of regions 18 and 22, means are provided for establishing ohmic or non-rectifying contact with the body 12. In this instance, the contact means include a contact portion 34 being of the one conductivity type in highly concentrated form, or of n+ type, and a lead 36 is secured to each contact portion 34.

In addition, a non-rectifying conductive relation is established between a lead 38 and each emitter 22, between a lead 40 and the region 30 and between a lead 42 and the collector 14. For isolation of the various columnar regional combinations, circumferential notches 44 and 45 are extended into the body 12. The notch 45 is also functional in other operating respects as will be described subsequently.

Figure 2:
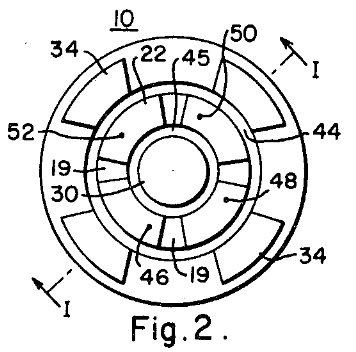
FIG. 2 is a diminished top plan view of the semiconductor device of the FIG. 1.

To this point in the description, the physical nature of the device 10, as embodied in FIGS. 1 and 2 has been considered. Its mode of operation is now to be determined. An electric path represented by dotted line (FIG. 1) or dot (FIG. 2) 46 or 48 or 50 or 52 is provided through each columnar combination of regions 22 and 18 and aligned portions of the body 12 and the collector 14. In addition, an electric path represented by dotted line 54, here enabling a pilot effect to be obtained, extends serially through the columnar combination of regions 30 and 26 and aligned portions of the body 12 and the collector 14. The path 54 provides a piloting effect in the sense that when it is conductive any other path 46 or 48 or 50 or 52 can be selectively induced to assume a conductive state.

Each of the paths 46 or 48 or 50 or 52 or 54 includes bistable switching means which comprises regions 22, 18, 12 and 14 or 30, 26, 12 and 14 of alternating conductivity type. Thus in this case, the switching means comprise an n-p-n-p (or p-n-p-n) switching combination and, therefore, can exist in a conductive or a substantially nonconductive state for reasons well known in the pertaining art. Briefly, by controlling the biasing of and the carrier movement through each p-n junction 20 or 28, the various switching means or combination can be switched between conductive and nonconductive states. To provide control of the carrier movement through a p-n junction 20 or 28, a voltage of critical magnitude and of reverse polarity relative to that p-n junction 20 or 28 can be applied across the associated switching combination namely across leads 38 and 42 or leads 40 and 42. Similarly, with the application of a lesser voltage, of adequate magnitude and of the polarity just described, across any one of the switching combinations, the introduction of a forward control voltage across the pertaining p-n junction 20 or 28 can lead to a switching effect between the nonconductive and the conductive state. Thus, the application, across any of the switching combinations, of a voltage, which is of reverse polarity relative to the included p-n junction 20 or 28, enables the combination to be switched to a conductive state if the voltage is of critical magnitude so as to cause sufficient minority carrier movement through the forward biased end p-n junctions 16 and 24 or 32 into the junctions 20 or 28. The junctions 20 and 28 then become forward biased. In the transitory period between the stable substantially nonconductive and the stable highly conductive states, the n-p-n-p or p-n-p-n switch exhibits negative impedance or resistance or in other terms, passes increasing current with decreasing applied voltage.

Assuming now that the paths 46, 48, 50 and 52 are nonconductive with a subcritical voltage of reverse polarity relative to the p-n junctions 20 impressed thereacross, and that a voltage of critical magnitude and of reverse polarity relative to the p-n junction 28 is impressed across the pilot path 54 to enable it to be conductive, means are provided for selectively switching any of the paths 46, 48, 50 and 52 into a conductive state. Thus, one need only impress a voltage of forward polarity relative to the p-n junction 16 across one of the contact portions 34 and the lead 42 of the collector 14 to induce the desired path 46 or 48 or 50 or 52 to become conductive. The applied voltage creates an electric field within the device 10 with a gradient along the body 12, and minority carriers in the body 12 in the vicinity of the pilot path 54 are transmitted along this field gradient toward the portion of the body 12 which is aligned with the electric path 46 or 48 or 50 or 52 and which is radially inward of the energized contact portion 34. The reduced section of the body 12, adjacent the circumferential notch 45, exhibits a relatively high electric field gradient therethrough so as to enhance the flow of carriers from the path 54 to the path 46 or 48 or 50 or 52 in response to the control voltage applied across the selected contact portion 34 and the collector 14. The transmitted carriers generally move radially and outwardly from the pilot path 54 toward the energized contact portion 34. Upon the delivery of a sufficient quantity of these carriers to the portion of the body 12 in the path 46 or 48 or 50 or 52, the associated p-n junction 20 becomes forward biased enabling current to flow in response to the aforementioned subcritical voltage across the path 46 or 48 or 50 or 52.

With the removal of the control voltage from the selected contact portion 34, the actuated path 46 or 48 or 50 or 52 can remain conductive or it can revert to its nonconductive state depending upon the dimensional parameters of the regions 12, 14, 18 and 22 and upon the dopant concentration in these regions and among other parameters the applied subcritical voltage across the path 46 or 48 or 50 or 52. On the other hand, the designer can provide for continued conduction in the path 46 or 48 or 50 or 52 for so long as a favorably polarized voltage is applied across the contact portion 34 and the collector 14 irrespective of the magnitude of or any reduction in the subcritical voltage across the path 46 or 48 or 50 or 52. If the voltage applied across the activated path 46 or 48 or 50 or 52 were to be reversed, in this embodiment of the invention, the pertaining path would become nonconductive.

When control carriers are removed in the manner and for the purpose just described from the body 12 in the vicinity of the pilot path 54, the pilot path 54 may become nonconductive, but the designer can provide for the pilot path 54 to remain conductive subsequent to the removal of the control carriers. As another notation, if the conductive state of the pilot path 54 and the application of a control voltage across one of the contact portions 34 and the collector 14 are coincident in time, the associated one of the paths 46 or 48 or 50 or 52 is driven to a conductive state. Thus, the device 10 can be a useful computer component, for example to provide "and" gating.

The particular form of the device 10 is not to be considered a limitative factor of the invention. Thus, although four paths are described and shown to be controllable between conductive and non-conductive states, it is anticipated that as many as 16 or more paths can be so controllable in the depicted circular geometry of the device 10. Of course, other geometric forms can be provided for devices fabricated in accordance with the principles of the invention.

Figure 6:
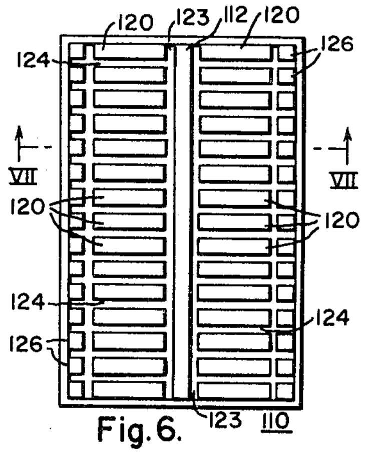
FIG. 6 is a top plan view of another semiconductor device embodied in accordance with the principles of the invention.
Figure 7:
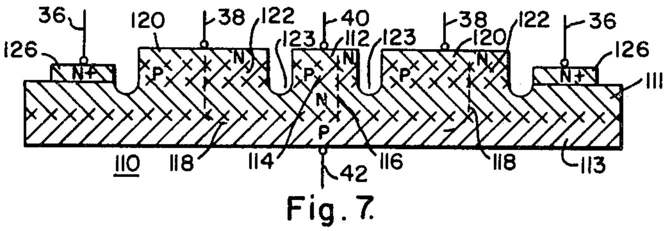
FIG. 7 is an enlarged longitudinally sectioned view of the device shown in FIG. 6.

For example, another embodiment of the invention, shown in FIGS. 6 and 7, is in the form of a device 110 having a generally rectangular geometry and including a body region 111 with which a collector region 113 is crystally adjoined. In this instance, a pilot switching combination comprises an elongated emitter region 112 being crystally adjoined with a region 114, which in turn is crystally adjoined with the body 111, with a pilot path 116 being formed serially through the regions 112, 114, 111, and 113.

Multiple controllable electric paths 118 are formed, respectively, through a plurality of switching combinations, with each of the latter comprising an elongated emitter region 120 being crystally adjoined with an elongated region 122 which, in turn, is crystally adjoined with the body 111. The regions 120 and 122 extend laterally of and are spaced from the regions 112 and 114 by a longitudinal notch 123 and are spaced from each other by notches or channels 124. A contact portion 126 is spaced outwardly from and aligned with each emitter region 120 for the purpose of obtaining continuity control of the paths 118 in the manner indicated in connection with the device 10.

The device 110 functions in a manner similar to the functioning of the device 10, but differs therefrom in the matter of geometry and the multiplicity of paths for which continuity controls can feasibly be provided. For example, one hundred or more paths 118 can, with practicability, be incorporated in the device 110. In the case of each device 10 or 110, although the various regions are shown as completely forming a monolithic member, they may form a portion of a monolithic member which operates as a larger system having a plurality of functions.

As an alternate, a simple multiple-switch operation of the devices 10 and 110 can be achieved. Thus, the pilot lead (electrode) 40 can be left open-circuited in each device 10 or 110, and the separate switching combinations between the lead 40 and the leads 38 then function as separate switching elements. With a subcritical voltage applied between each of the leads 38 and the lead 42, the respective paths 46–52 (in the device 10) or paths 118 (in the device 110) can be switched between on and off conditions by application of suitably polarized and suitably sized voltages between the leads 36 and the lead 42. Excellent isolation of the separate switching combinations exists. When the mode of operation just described is desired exclusively, the pilot structure in the device 10 or 110, namely the regions 26 and 30 or the regions 112 and 114, can be omitted in construction. In the case of the device 110, the switch structure can then comprise the portion of the semiconductor block extending from either notch 123 to the nearest longitudinal edge of the block.

Figure 3:
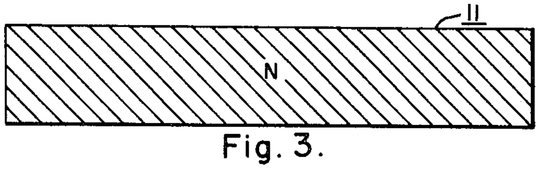
FIG. 3 is a diametrically sectioned view of a semiconductive wafer from which the device of FIG. 1 can be formed.
Figure 4:
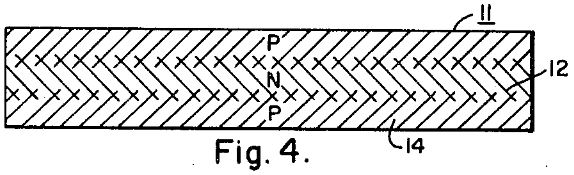
FIG. 4 is a diametrically sectioned view of the wafer of FIG. 3 in a first formative stage.
Figure 5:
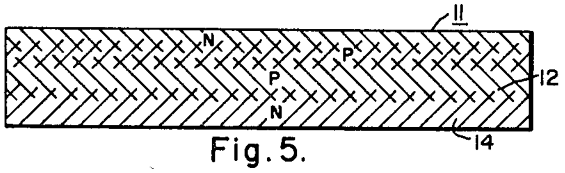
FIG. 5 is a diametrically sectioned view of the wafer of FIG. 3 in a second formative stage.

To fabricate the device 10 of FIGS. 1 and 2, one can utilize a wafer 11 (shown in FIG. 3) of one conductivity type, in this instance n type. The semiconductive material employed can be, as an example, suitably doped silicon or germanium or a stoichiometric compound of elements of Groups III and V of the Periodic Table, for example, gallium arsenide, gallium antimonide, gallium phosphide, indium arsenide and indium antimonide. A suitable donor or n-type dopant is arsenic, antimony or phosphorus.

The wafer 11 can be prepared by any of the well known methods in the pertaining art, for example by pulling a single crystal silicon rod from a melt comprised of the selected semiconductive material. The wafer 11 is then cut from the rod with, as one example, a diamond saw and then the surface of the wafer 11 can be lapped or etched or both lapped and etched to produce a smooth surface after sawing. The device 10 can also be formed from a dendrite which can be prepared in accordance with a copending application of A. Bennett entitled Process for Producing Crystals and the Product Thereof, Serial No. 844,288, filed October 5, 1959, and assigned to the present assignee.

To form the regions 14, 18 and 26, conventional alloying or diffusion techniques can be employed. The wafer 11, being suitably masked if desired, can be positioned in the hottest zone of a diffusion furnace with a temperature within the range of 1100° C. to 1200° C. and with an atmosphere of the vapor of an acceptor or p-type doping material such as indium, gallium, aluminum or boron. A crucible of the acceptor impurity or of a compound of the same is positioned in another zone of the furnace where the crucible temperature is within the range from 600° C. to 1200° C., with the specific temperature being selected to provide the desired vapor pressure and surface concentration of the diffusant over the wafer 11. The acceptor impurity diffuses into the surface of the n-type wafer 11 to provide the region 14 and the regions 18 and 26 if masking techniques are employed. However, if masking is not provided, subsequent etching or abrading procedures would be required for finally forming the regions 18 and 26.

Subsequently, the wafer 11, again being suitably masked if desired, can be placed in the diffusion furnace in the presence of a donor dopant, such as arsenic, antimony or phosphorus, which diffuses into the regions 18 and 26 to a depth creating the regions 22 and 30, but not so deeply as to penetrate to the P-N junctions 20 and 28 and therefore not to dominate the regions 18 and 26. Notches 44 and 45 can then be etched or abraded into the body 12 to be in the final form shown in FIG. 6. Processing steps similar to those just described in connection with the device 10 can be employed in forming the device 110.

The preceding description has been set forth only to illustrate the principles of the invention. Accordingly, the invention is not to be limited by the embodiments described here, but, rather, is to be interpreted consistently with the scope and spirit of its broad principles.

What is claimed is:

1. A monolithic semiconductor multiple switch device comprising a pilot semiconductor regional switch combination and a plurality of other semiconductor regional switch combinations, a semiconductive layer of one conductivity type having a first portion forming a portion of said pilot switch, said semiconductive layer having respective other portions forming respective portions of said other switches and spaced from each other and from said pilot switch layer portion so that said switches normally are independently operable, and respective electrodes in non-rectifying contact with said layer respectively in proximity with said other switch layer portion, said other switches disposed electrically between said electrodes and said pilot switch so that a switch triggering quantity of pilot switch carriers is transferred through said layer selectively and respectively to said other switch layer portions when said pilot switch is conducting and when an electric field of predetermined strength is applied between said pilot switch layer portion and the selected electrode.

2. A monolithic semiconductor multiple switch device comprising a four layer bistable pilot switch and a plurality of other four layer bistable switches, a first semiconductive layer of one conductivity type, a second semiconductive layer of the opposite conductivity type crystally joining said first layer to form a p-n junction therewith, a first zone extending through said layers to form a portion of said pilot switch, respective other zones extending through said layers to form respective portions of said other switches and being spaced from each other and from said pilot switch zone so that said switches normally are independently operable, and respective contact means electrically connected to respective portions of said first layer within said other switch zones so that a switch triggering quantity of pilot switch carriers is transferred through said first layer selectively and respectively to said first layer portions when said pilot switch is conducting and when an electric field of predetermined strength is applied between said pilot switch zone and the selected contact means.

3. A monolithic semiconductor multiple switch device as set forth in claim 2, wherein said first layer is provided with a generally circular geometry, said pilot switch is disposed with said first zone thereof located substantially centrally of said first layer, said other switches are disposed with said other zones thereof located radially outwardly of and circumferentially about said pilot switch in spaced relation to each other, said contact means are contiguous with said first layer and are disposed radially outwardly of and circumferentially about said other switches in spaced relation to each other, and said contact means respectively are aligned radially with said other switches.

4. A monolithic semiconductor multiple switch device as set forth in claim 2, wherein said first layer is provided with a generally rectangular geometry, said pilot switch is disposed with said first zone thereof extending along a first direction, said other switches are disposed with said other zones thereof spaced from each other in said first direction and extending laterally of said first zone in another direction lateral to said first direction, said other switches are disposed on at least one side of said pilot switch, and said contact means are contiguous with said first layer and are spaced from each other in said first direction and are respectively disposed in alignment with said other switches in said other direction and said other switches are disposed between said contact means and said pilot switch.

5. A monolithic semiconductor multiple switch device comprising a pilot semiconductor regional switch combination and a plurality of other semiconductor regional switch combinations, a semiconductor layer of one conductivity type having a first portion forming a portion of said pilot switch, said semiconductive layer having respective other portions forming respective portions of said other switches and spaced from each other and from said pilot switch layer portion so that said switches normally are independently operable and so that an electric field gradient can be established directly from said pilot switch first portion to each of said other switch layer portions, and discrete means directly connected to each of said other switches for energizing the associated other switch layer portion, said discrete energizing means being operable independently of each other and being operable individually and respectively to produce an electric field gradient and to transfer a switch triggering quantity of pilot switch carriers from said pilot switch selectively and directly to the associated other switch layer portion when said pilot switch is conducting.

6. A monolithic semiconductor multiple switch device comprising a four layer bistable pilot switch and a plurality of other semiconductor regional switch combinations, a semiconductor layer of one conductivity type having a first portion forming a portion of said pilot switch, said semiconductive layer having respective other portions forming respective portions of said other switches and spaced from each other and from said pilot switch layer portion so that said switches normally are independently operable and so that an electric field gradient can be established directly from said pilot switch first portion to each of said other switch layer portions, and discrete means directly connected to each of said other switches for energizing the associated other switch layer portion, said discrete energizing means being operable independently of each other and being operable individually and respectively to produce an electric field gradient and to transfer a switch triggering quantity of pilot switch carriers from said pilot switch selectively and directly to the associated other switch layer portion when said pilot switch is conducting.

7. A monolithic semiconductor multiple switch device comprising a four layer bistable pilot switch and a plurality of other four layer bistable switches, a semiconductive layer of one conductivity type having a first portion forming a portion of said pilot switch, said semiconductive layer having respective other portions forming respective portions of said other switches and spaced from each other and from said pilot switch layer portion so that said switches normally are independently operable and so that an electric field gradient can be established directly from said pilot switch first portion to each of said other switch layer portions, and discrete means directly connected to each of said other switches for energizing the associated other switch layer portion, said discrete energizing means being operable independently of each other and being operable individually and respectively to produce an electric field gradient and to transfer a switch triggering quantity of pilot switch carriers from said pilot switch selectively and directly to the associated other switch layer portion when said pilot switch is conducting.

References Cited by the Examiner

UNITED STATES PATENTS

| | | | |
|---|---|---|---|
| 2,655,607 | 10/53 | Reeves | 317—235 |
| 2,754,431 | 7/56 | Johnson | 317—235 |
| 2,897,295 | 7/59 | Zelinka | 317—235 |
| 2,910,634 | 10/59 | Rutz | 317—235 |
| 2,967,952 | 1/61 | Shockley | 317—235 |
| 3,038,085 | 6/62 | Wallmark et al. | 317—235 X |
| 3,090,873 | 5/63 | Mackintosh | 317—235 |
| 3,103,599 | 9/63 | Henkels | 317—235 |
| 3,113,222 | 12/63 | Czaczkowski | 317—235 |

JOHN W. HUCKERT, *Primary Examiner.*

JAMES D. KALLAM, DAVID J. GALVIN, *Examiners.*